George F. Wislicenus
INVENTOR

George F. Wislicenus
INVENTOR

George F. Wislicenus
INVENTOR

BY
ATTORNEY

Feb. 26, 1946. G. F. WISLICENUS 2,395,704
ROTOR
Filed March 2, 1944 5 Sheets-Sheet 5
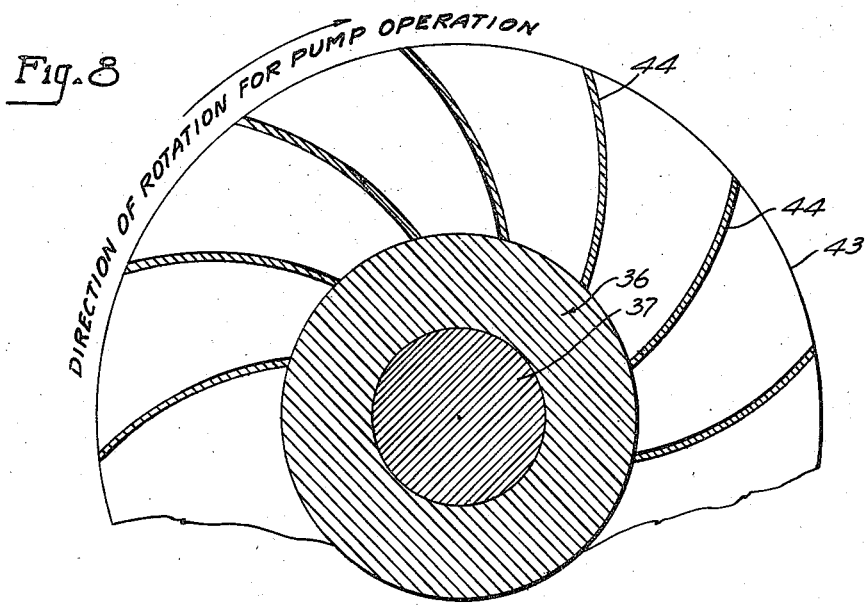
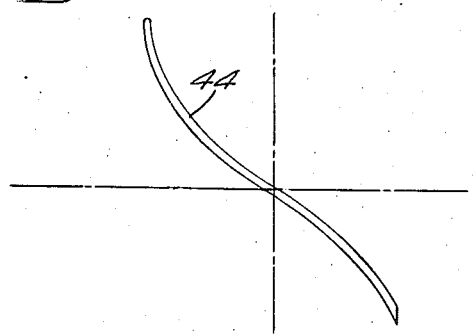
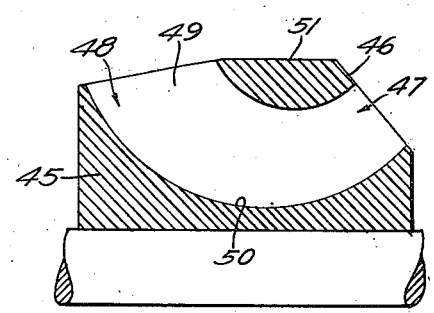
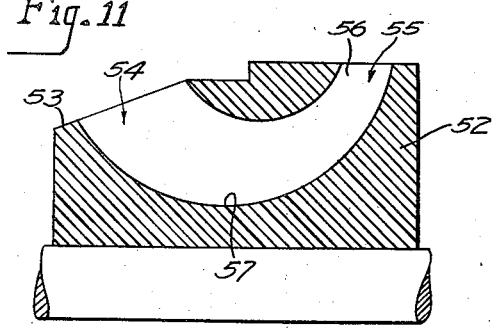
George F. Wislicenus
INVENTOR
BY
ATTORNEY Patented Feb. 26, 1946

2,395,704

UNITED STATES PATENT OFFICE 2,395,704

ROTOR

George F. Wislicenus, Summit, N. J., assignor to Worthington Pump and Machinery Corporation, Harrison, N. J., a corporation of Delaware Application March 2, 1944, Serial No. 524,713

12 Claims. (Cl. 103—115)

This invention relates to machines such as pumps, compressors, turbines, and the like, and more particularly to a rotor for machines of the foregoing type.

The primary object of the present invention is to provide a rotor of the type described which is of such design as to permit removal of the rotor as a unit from the casing without removing or opening any stationary parts of the casing other than the end covers thereof.

Another object is to provide a rotor having an impeller wearing surface of a diameter equal to or slightly greater than the outside diameter of the impeller, thereby eliminating the necessity of any stationary parts such as diaphragms which reach between the impellers of the individual stages, to the end that the axial length required for each stage may be reduced and the number of stages increased within the limits of a relatively short bearing span of the rotor.

Another object is to provide a rotor wherein the impellers may be permanently and fixedly secured to the rotor shaft, as by welding or other suitable means, in which the rotor may be accurately machined in one setting, and in which the rotor may be dynamically balanced as a whole.

Another object is to provide a rotor wherein the impellers may be more or less permanently attached to the rotor shaft in such manner as to eliminate the necessity of spacer sleeves for holding the individual impellers, and in which the construction is such as to permit undercutting of the rotor shaft in the region of the impeller inlet for reducing the impeller inlet diameter without an undue reduction of the average shaft diameter.

A further object is to provide a rotor embodying novel fluid intake passages having rotating stay vanes, and in which these stay vanes are so arranged in the fluid passages and co-act with the body of the rotor in such manner as to function as strut means for resisting deflection of the rotor. This permits the construction of a longer rotor and the use of an increased number of stages without the necessity of internal bearings.

Another object is to provide a series of rotors which is well adapted for use in pumps, blowers, compressors, hydraulic turbines, steam turbines, gas turbines, and hydraulic transmissions or analogous structures. The rotors embody a general principle which enables a designer in using such a rotor structure to greatly modify and in many instances simplify the construction of the surrounding and corresponding parts to meet specific operating conditions. Accordingly, the resultant machine may be manufactured at a lower cost and may be more readily assembled or dismantled for repair or other purposes.

With these and other objects in view, as may appear from the accompanying specification, the invention consists of various features of construction and combination of parts, which will be first described in connection with the accompanying drawings, showing a rotor of a preferred form embodying the invention, and the features forming the invention will be specifically pointed out in the claims.

In the drawings:

Figure 8 is a sectional view taken along the line 7—7 of Figure 6.

Figure 9 is an approximate conformal representation of one of the vanes of Figure 6 when sectioned according to the line 8—8 of Figure 6.

Figure 10 is a sectional view of another type of impeller.

Figure 11 is a sectional view of a further modification in the impeller structure.

Figure 2:
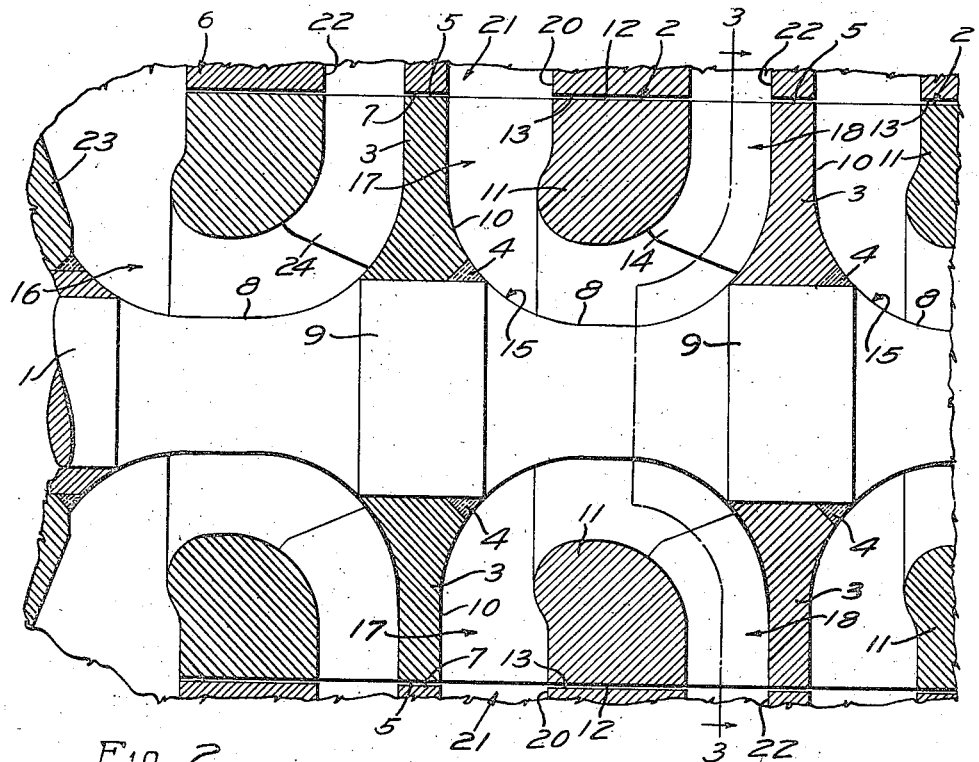
Figure 2 is a fragmentary, longitudinal sectional view of a rotor in accordance with the invention.

Referring more particularly to the drawings, the improved rotor comprises a shaft 1 having a series of impellers 2 attached thereto. The impellers except that of the end stage are of like construction and each includes a rotating wall or disc 3 attached to the shaft 1, as by a weld 4 or other suitable means. In Figure 2, the walls 3 have annular wearing surfaces 5 of a common diameter, and the rotor is axially receivable in a casing indicated fragmentarily at 6, the casing having annular wearing faces 7 arranged in coactive relationship with the wearing faces 5. While the present invention is directed to the rotor structure, the latter is adaptable for use in a pump structure of the type embodied in an application for patent on centrifugal pump filed on even date herewith, although the rotor is not limited to a pump service because of its adaptability to machines of the types previously mentioned.

Figure 2 illustrates the shaft 1 as being undercut at 8, the undercuts comprising circumferential grooves in the shaft. The walls 3 are mounted on the uncut shaft portions 9, and the wall faces 10 are so shaped as to comprise continuations of the faces of the undercuts or grooves 8. Between the walls 3 are arranged annular rings 11 provided with wearing surfaces 12 of the same diameter as the wearing surfaces 5. The wearing faces 12 are arranged in co-active relationship with wearing surfaces 13 in the casing 6.

Figure 1:
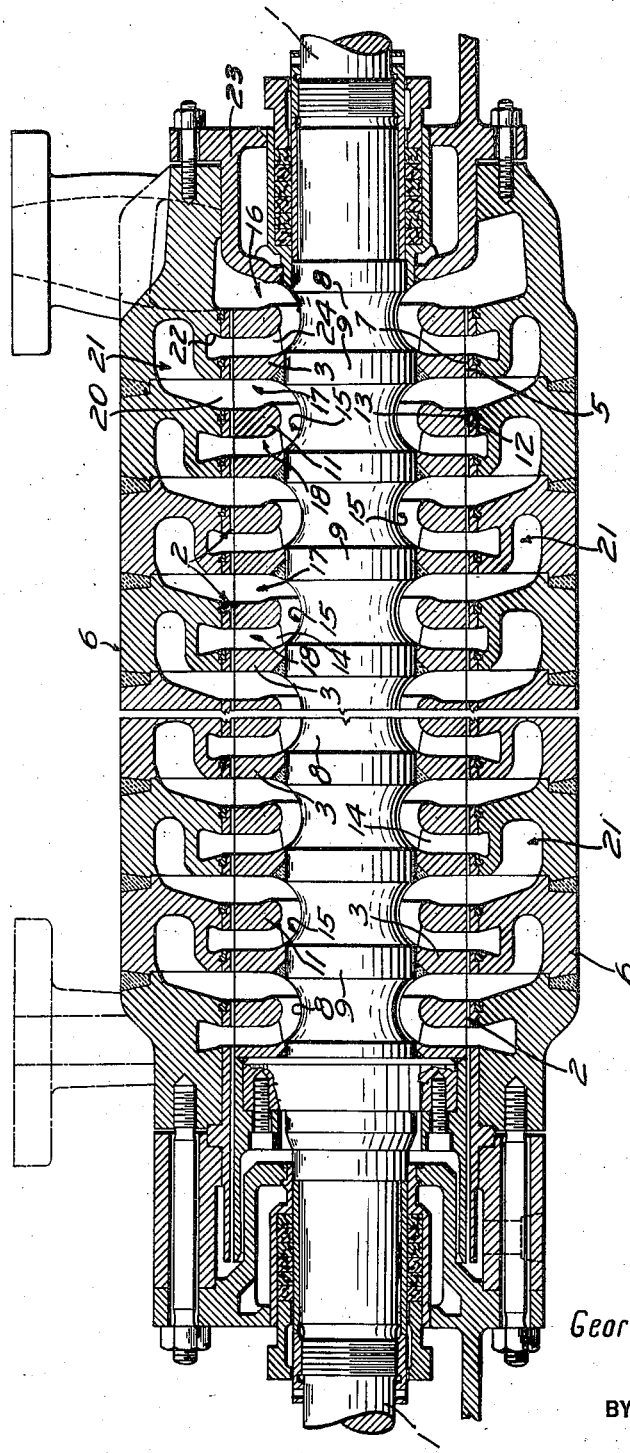
Figure 1 is a longitudinal section through a multi-stage centrifugal pump embodying the present invention.

Outward flow impeller vanes 14 fixedly relate the respective rings 11 to their associated walls 3, and the rings 11 are of such shape and so arranged as to co-act with the walls 3 to provide generally U-shaped fluid passages 15. The first or suction stage inlet is indicated at 16. Each passage 15 extends circumferentially of the axis of the rotor, and the legs 17 and 18 comprise fluid inlets and fluid outlets, respectively. Both the fluid inlets and the fluid outlets extend 360° about the rotor and open through the annular perimeter of the rotor. Figures 1 and 2 show the vanes 14 as being located in the legs 18 of the respective fluid passages 15, the direction of rotor rotation being indicated by the arrow 19 in Figure 2 for pump operation. The direction of rotation for turbine operation is usually opposite.

Referring to Figures 1 and 2, the fluid inlet legs 17 of the passages 15 communicate with discharge legs 20 of fluid passages 21 in the casing 6, while the legs 18 communicate with the inlet legs 22 of the passages 21. One of the casing end caps is indicated at 23 in Figure 1, and the end stage inlet 16 is provided with outward flow vanes 24 arranged in circumferential alignment with the first inlet leg 22.

In a rotor construction of the type illustrated in Figures 1 and 2, the walls 3 are permanently attached to the shaft 1. This construction eliminates the necessity of spacer sleeves for attaching the impeller units to the shaft 1, with the result that the shaft 1 may be undercut to materially reduce the impeller inlet diameter without an undue reduction of the average shaft diameter, in addition to reducing the pick-up velocity with consequent improvement in the efficiency of the impeller structure. The wearing faces 5 and 12 are of diameters at least equal to the maximum diameter of the rotor to eliminate the need for stationary parts which reach between the impellers of the individual stages. Furthermore, the rotor comprises a unit of relatively simple construction which may be removed intact from its associated casing.

Figure 3:
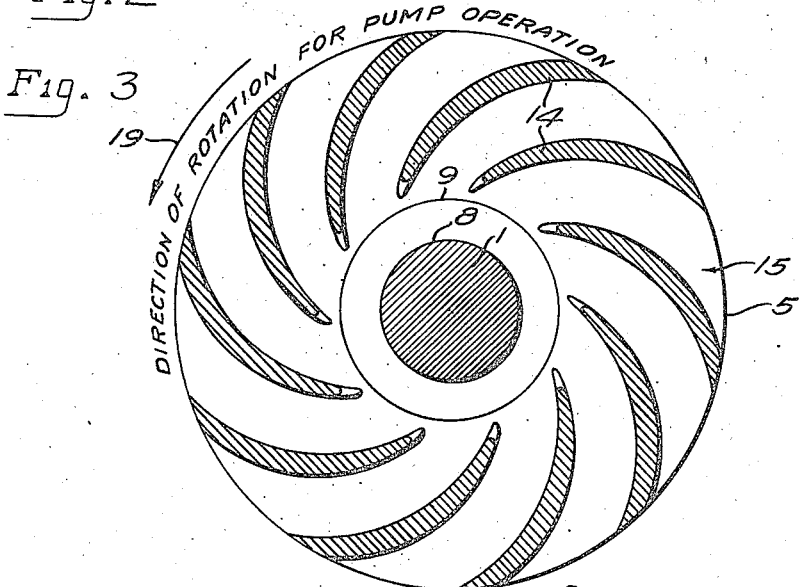
Figure 3 is a sectional view taken along the line 2—2 of Figure 2.
Figure 4:
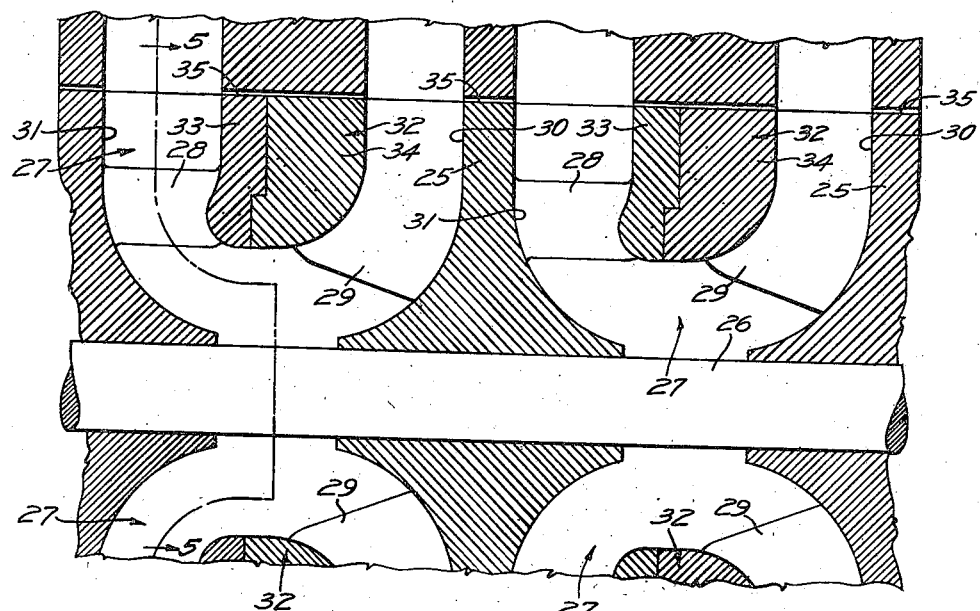
Figure 4 is a fragmentary, longitudinal sectional view of a different form of rotor structure.
Figure 5:
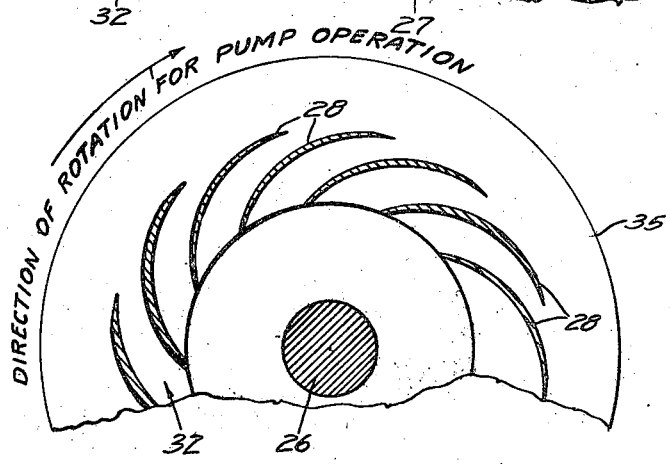
Figure 5 is a sectional view taken along the line 4—4 of Figure 4.

Figures 3 and 4 illustrate a different type of rotor wherein the rotating walls or discs 25 are also fixedly attached to a rotor shaft 26 of relatively small diameter, but in which the fluid passages 27 are provided with inward flow vanes 28 in addition to the outward flow vanes 29. The fluid passages 27 are generally U-shaped in cross-section and are similar to the fluid passages 15 in that they extend 360° about the rotor. The outward flow vanes 29 are located in the fluid discharge legs 30 of the respective fluid passages 27, while the inward flow vanes 28 are located in the respective inlet legs 31 of the fluid passages 27. In Figure 3, the annular rings 32 corresponding to the rings 11 are respectively made up of sections 33 and 34 arranged in engagement with each other. The vanes 28 fixedly relate the sections 33 to the walls 25 and the vanes 29 fixedly relate the section 34 to the walls 25. All the walls 25 and the rings 32 are provided with annular wearing faces 35 having a common diameter so that the rotor may be removed intact from its casing in the same manner as the structure shown in Figures 1 and 2.

The vanes 28 and 29 function as strut means interposed between the walls 25, 33, and 34 in such manner as to provide a continuous mechanical structure of relatively large diameter and one which lends a desirable stiffness to the rotor structure without depending on the stiffness of the shaft. In a rotor of this type wherein rigidity of the rotating parts is built up by the effective coupling together of all of the impeller structures by means of the inward flow vanes 28, many of the disadvantages, such as deflection characteristic of rotors of approved types now in use are eliminated. The added rigidity not only eliminates excessive wear on parts of the rotor and its associated casing incident to deflection, but greatly simplifies the problem of sealing the shaft against leakage and leakage tendencies occasioned by objectionable deflection of the rotor.

The increased bending stiffness of the rotor also enables the rotor to withstand unbalanced hydraulic forces more successfully. As a consequence of added stiffness, the rotor may be built considerably longer, in that a larger number of stages than heretofore possible may be employed without the aid of internal bearings. Furthermore, the construction permits the use of a larger number of stages in series in lieu of splitting up the stages into various series in accordance with conventional practice. Addition of the inward flow vanes may add to the pressure developed by a pump when incorporated in a machine of this type, although the vanes may be so designed as not to increase the pressure.

Figure 6:
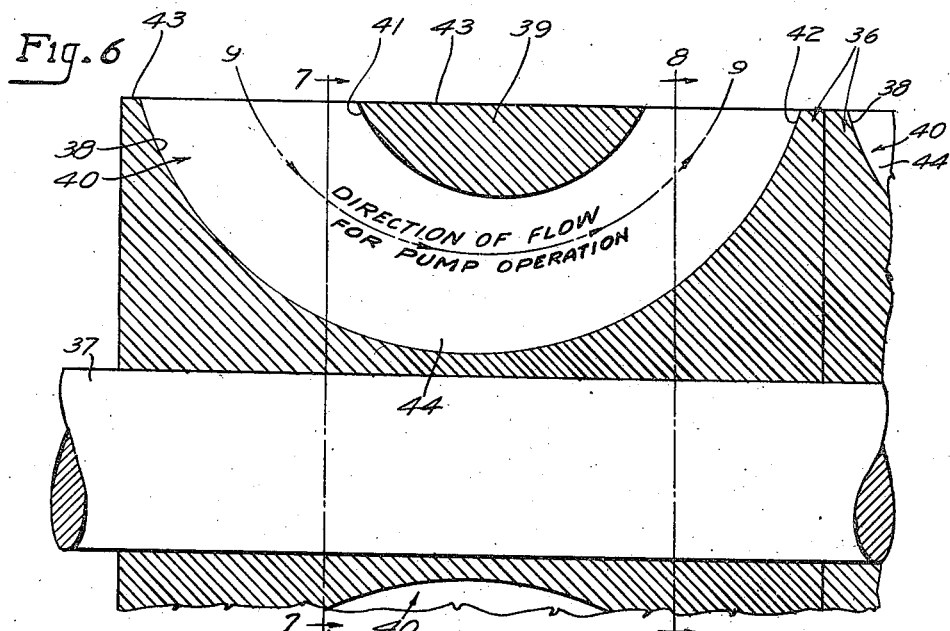
Figure 6 is a fragmentary, longitudinal sectional view of another type of rotor structure.
Figure 7:
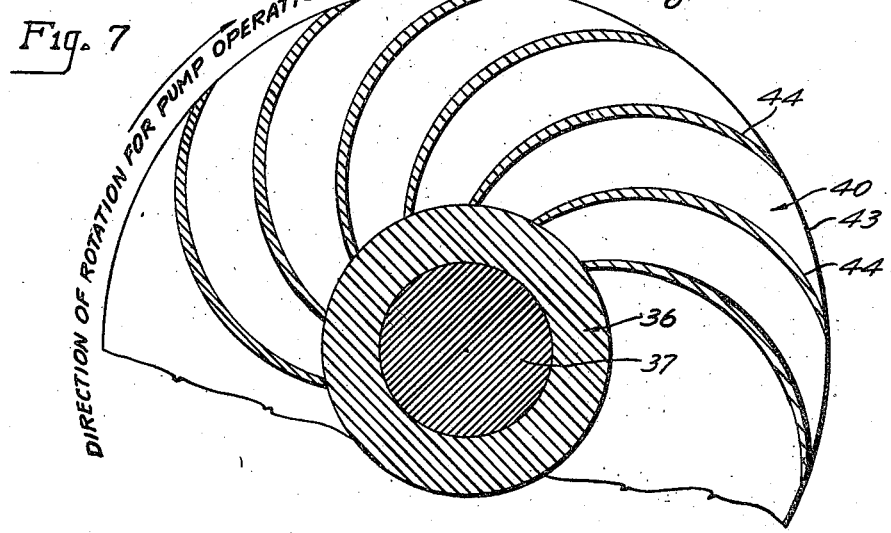
Figure 7 is a sectional view taken along the line 6—6 of Figure 6.

Figures 6, 7, and 8 illustrate a rotor construction wherein the impeller units 36 are fixedly attached to a shaft 37 and provided with circumferential grooves 38 within which are arranged annular rings 39 spaced from the respective groove faces to provide fluid passages 40 of generally U-shaped contour. The fluid inlet legs 41 and the fluid outlet legs 42 of the respective passages 40 open through the annular faces of the impellers. The passages 40 extend 360° about the rotor, and the rings 39 and the impeller units 36 are provided with wearing faces 43 of a common diameter at least equal to the rotor.

Combination inward flow and outward flow vanes 44 are arranged in the passages 40. The vanes 44 extend from end to end of the respective passages 40, and the vanes function as means for fixedly relating the rings 39 to the impeller bodies 36. Figures 7 and 8 illustrate the contours of the vanes in the planes of their inward and outward flow formations. A rotor of the type shown in Figures 6, 7, and 8 is well adapted for use in centrifugal pumps of relatively high specific speeds. The impeller structure of Figures 6, 7, and 8 is capable of operating under specific speeds considerably greater than is possible with impeller structures of the type shown in Figures 1 through 5. In Figure 6, the passages 40 taper slightly throughout their entire length from the inlet to the outlet ends. It should be noted that the width of the U-shaped passages 40 is larger in comparison with the diameter of the passage than is true in connection with the impeller structure of Figures 1 through 5. The impeller structure of Figure 6 is an exceptionally durable one, with the vanes 40 lending exceptional rigidity to the rotor as a whole.

Figures 10 and 11 show impellers similar to the structure of Figure 6 with respect to the vane structure. However, impeller body 45 is cut away at 46 so that the diameter of the fluid outlet 47 is smaller than the fluid inlet 48. The vanes 49 extend from end to end of the fluid passage 50, and the ring 51 is fixedly related to the body 45 through the medium of the vanes.

With respect to the structure of Figure 11, the impeller body 52 is cut away at 53 so that the diameter of the inlet 54 is somewhat less than the diameter of the outlet 55. In this form, the vanes 56 also extend from end to end of the passage 57. Figures 10 and 11 illustrate the manner in which the length of the U-shaped fluid passage may be varied to meet specific hydraulic conditions in the pump or other type of machine to which the impeller structure is applied. Reduction in the diameter of the inlet of the fluid passage tends to increase the hydraulic stability of the impeller.

All the forms of rotors illustrated are of such construction as to be axially removable from the casing structure. The rotors embody large diameter wearing faces, eliminate the necessity of spacer sleeves, with the construction such as to permit the running joints to be accurately machined in one setting, in addition to permitting dynamic balancing of the rotor as a whole. All the impellers are fixedly attached to the shaft to provide a rotor of unitary construction which, because of its axial removability, eliminates the necessity of tedious piece by piece dismantling when being removed from the casing. In the structures of Figures 4 through 11, the vanes are of such construction and arrangement as to provide strut means which add such stiffness to the rotor structures as to eliminate objectionable deflection. All the fluid passages are generally U-shaped in cross section, and the fluid inlets and outlets of the passages open outwardly through the annular or cylindrical faces of the respective rotors.

While in the foregoing description and in the drawings the invention is shown and described as applied to a centrifugal pump, it is to be understood that it is equally applicable for use in turbines, centrifugal compressors or like mechanisms; and that when applied to turbines, the direction of rotation of the rotor will be the reverse of that indicated in the drawings, as will be understood by one skilled in the art.

It will be understood that the invention is not to be limited to the specific construction or arrangement of parts shown, but that they may be widely modified within the invention defined by the claims.

What is claimed is:

1. A rotor for machines such as pumps, compressors, turbines and the like, comprising a rotative body having a cylindrical surface and a fluid passage lying wholly beneath the cylindrical surface, one end of said fluid passage opening through said cylindrical surface to provide a fluid inlet and the other end of said fluid passage opening through the cylindrical surface to provide a fluid outlet, and vanes in said fluid passage, said vanes being shaped to provide curved inward flow contours and outward flow contours curved reversely of the curvature of the inward flow contours and in structural continuation of the inward flow contours.

2. A rotor for machines such as pumps, compressors, turbines and the like, comprising a rotative body having a cylindrical surface and a fluid passage lying wholly beneath said cylindrical surface, one end of said fluid passage opening through 360° of said cylindrical surface to provide a fluid inlet and the other end of said fluid passage opening through 360° of said cylindrical surface to provide a fluid outlet, and vanes in said fluid passage, said vanes being shaped to provide curved inward flow contours and outward flow contours in structural continuation of said inward flow contours.

3. In a rotor for machines such as pumps, compressors, turbines and the like, comprising a rotative body having a cylindrical surface and a fluid passage lying wholly beneath said cylindrical surface, one end of said fluid passage opening through 360° of said fluid passage to provide a fluid inlet and the other end of said fluid passage opening through the cylindrical surface to provide a fluid outlet, said fluid passage being of progressively smaller cross-sectional area in the direction of fluid flow through the passage, and vanes in said fluid passage, said vanes being shaped to provide curved inward flow contours and outward flow contours curved reversely of the curvature of the inward flow contours and in structural continuation of the inward flow contours.

4. A rotor for machines such as pumps, comprising a rotative body having a fluid passage generally U-shaped in cross section, and vanes in said fluid passage, said vanes being shaped to provide curved inward flow contours and outward flow contours curved reversely of the curvature of the inward flow contours and in structural continuation of the inward flow contours.

5. A rotor for machines such as pumps comprising a rotative body having an annular contour, said body being provided with a fluid passage generally U-shaped in cross section and lying wholly within the annular contour of the body, said fluid passage opening through 360° of the annular contour of the body to provide a fluid inlet and opening through 360° of the annular contour to provide a fluid outlet, said fluid inlet being of smaller diameter than the fluid outlet, and vanes in said fluid passage, said vanes being shaped to provide curved inward flow contours and outward flow contours curved reversely of the curvature of the inward flow contours and in structural continuation of the inward flow contours.

6. A rotor for machines such as pumps comprising a rotative body having an annular contour, said body being provided with a fluid passage generally U-shaped in cross section and lying wholly within the annular contour of the body, said fluid passage opening through 360° of the annular contour of the body to provide a fluid inlet and opening through 360° of the annular contour to provide a fluid outlet, said fluid inlet being of larger diameter than said fluid outlet, and vanes in said fluid passage, said vanes being shaped to provide inward flow contours and outward flow contours curved reversely of the inward flow contours and in structural continuation of the inward flow contours.

7. A rotor for machines such as pumps comprising a rotative body having an annular contour, said body being provided with a fluid passage generally U-shaped in cross section and lying wholly within the annular contour of the body, said fluid passage opening through 360° of the annular contour of the body to provide a fluid inlet and opening through 360° of the annular contour to provide a fluid outlet, said fluid inlet being of smaller diameter than the fluid outlet, and vanes in said fluid passage, said vanes being shaped to provide inward flow contours and outward flow contours in structural continuation of the inward flow contours, said fluid passage being of progressively smaller cross-sectional area in the direction of fluid flow through the passage.

8. A rotor for machines such as pumps comprising a rotative body having an annular contour, said body being provided with a fluid passage generally U-shaped in cross section and lying wholly within the annular contour of the body, said fluid passage opening through 360° of the annular contour of the body to provide a fluid inlet and opening through 360° of the annular contour to provide a fluid outlet, said fluid inlet being of larger diameter than said fluid outlet, and vanes in said fluid passage, said vanes being shaped to provide inward flow contours and outward flow contours in structural continuation of the inward flow contours, said fluid passage being of smaller cross-sectional area from its inlet end toward its outlet end.

9. A rotor comprising a shaft, an impeller body fixed to said shaft, said impeller body being provided with an annular fluid passage U-shaped in cross-section, said shaft being undercut to provide a groove comprising a continuation of said fluid passage, said impeller body having a cylindrical face and said fluid passage opening through said cylindrical face to provide a fluid inlet and a fluid outlet, and vanes in said fluid passage.

10. A rotor comprising a shaft, an impeller body fixed to said shaft, said impeller body being provided with an annular fluid passage U-shaped in cross-section, said shaft being undercut to provide a groove comprising a continuation of said fluid passage, said impeller body having a cylindrical face and said fluid passage opening through said cylindrical face to provide a fluid inlet and a fluid outlet, and deflecting vanes in said fluid passage, said fluid inlet and the fluid outlet extending 360° about said surface of revolution and being of the same diameter.

11. A rotor comprising a shaft, an impeller body fixed to said shaft, said impeller body being provided with an annular fluid passage U-shaped in cross-section, said shaft being undercut to provide a groove comprising a continuation of said fluid passage, said impeller body having a cylindrical face and said fluid passage opening through said cylindrical face to provide a fluid inlet and a fluid outlet, and fluid deflecting vanes in said fluid passage, said fluid inlet and the fluid outlet each extending 360° about said cylindrical face, said fluid inlet being of smaller cross-sectional area than said fluid outlet.

12. A rotor comprising a shaft, an impeller body fixed to said shaft, said impeller body being provided with an annular fluid passage U-shaped in cross-section, said shaft being undercut to provide a groove comprising a continuation of said fluid passage, said impeller body having a circular face and said fluid passage opening through said circular face to provide a fluid inlet and a fluid outlet, and fluid deflecting vanes in said fluid passage, said vanes being contoured to provide inward flow formations lying in said fluid inlet and outward flow formations lying in said fluid outlet, said fluid inlet and said fluid outlet extending 360° about said cylindrical face, said fluid outlet being of smaller cross-sectional area than said fluid inlet.

GEORGE F. WISLICENUS.